United States Patent [19]

Yarnitsky et al.

[11] Patent Number: 4,466,555

[45] Date of Patent: Aug. 21, 1984

[54] JIG FOR USE IN MACHINING STYLUS BLANKS

[75] Inventors: Yashaya Yarnitsky; Avinoam Livny, both of Haifa, Israel

[73] Assignee: RCA Corporation, New York, N.Y.

[21] Appl. No.: 285,613

[22] Filed: Jul. 21, 1981

[51] Int. Cl.³ .............................................. B65H 5/00
[52] U.S. Cl. .................................... 221/224; 221/232; 221/238; 221/267; 221/220; 269/254 R; 227/130; 81/57.37
[58] Field of Search .............. 221/191, 210, 219, 220, 221/223, 232, 267, 288, 310, 376, 224, 225, 226, 236, 238, 195, 66, 255; 81/57.37, 452; 227/130; 414/131, 751; 269/254, 287; 279/28, 29, 35, 51

[56] References Cited

U.S. PATENT DOCUMENTS

| | | | |
|---|---|---|---|
| 1,511,565 | 10/1924 | Kinsley | 221/267 X |
| 1,815,594 | 7/1931 | Shaw et al. | 81/57.37 |
| 2,495,070 | 1/1950 | Mellodge | 221/267 X |
| 2,585,747 | 2/1952 | Denzler | 279/51 |
| 3,019,027 | 1/1962 | Klein et al. | 279/30 |
| 3,907,014 | 9/1975 | Manino | 81/57.37 |
| 3,975,032 | 8/1976 | Bent et al. | 279/30 |

FOREIGN PATENT DOCUMENTS 272010  11/1950  Switzerland ................... 221/267

Primary Examiner—Joseph J. Rolla
Assistant Examiner—George Pyryt
Attorney, Agent, or Firm—Birgit E. Morris; Donald S. Cohen; Thomas H. Magee

[57] ABSTRACT

A jig comprises a housing which has a front end and a storage channel. A split collet and an elongated slotted bar attached thereto are slideably moveable into and out of the housing. The jig further has an elongated bolt for transporting individual blanks from the storage channel to the front end of the housing. Respective first and second pistons located inside the housing are provided for operating the split collet and the elongated bolt. The split collet is movably received within the housing and is not formed by a section thereof.

15 Claims, 5 Drawing Figures

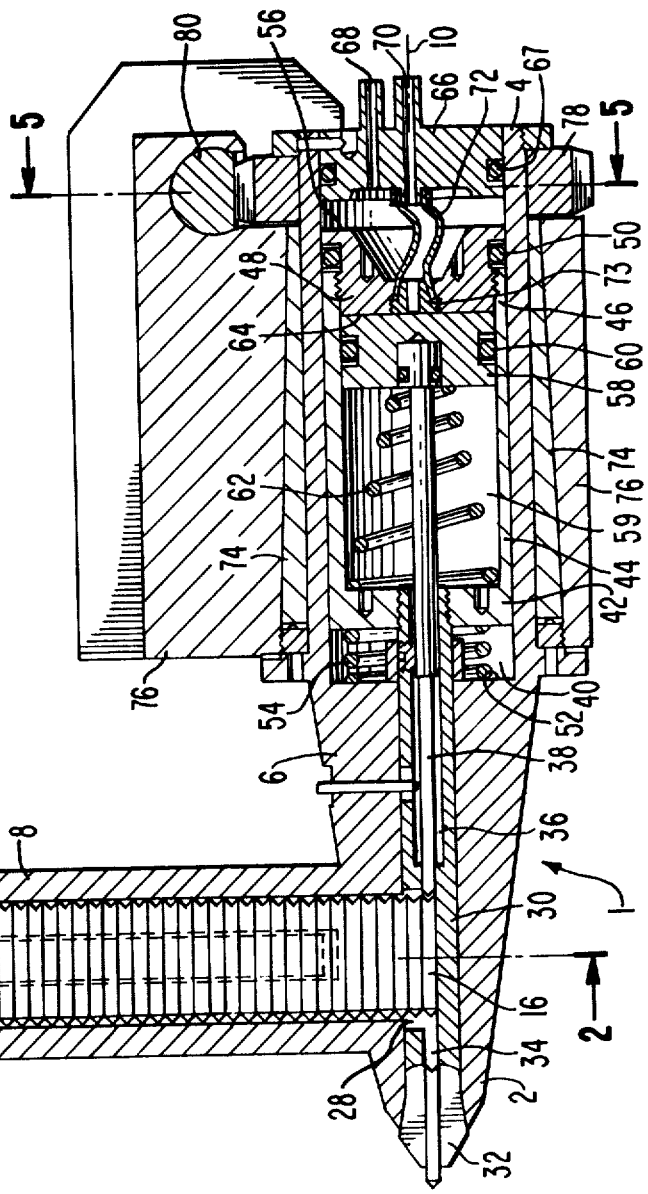

JIG FOR USE IN MACHINING STYLUS BLANKS

BACKGROUND OF THE INVENTION

1. FIELD OF THE INVENTION

This invention pertains to a jig for use in machining blanks. More particularly, this invention pertains to a jig which is designed to hold stylus blanks during lapping in order to produce a keel-tipped stylus, such as the stylus disclosed in U.S. Pat. No. 4,162,510, issued to E. O. Keizer on Jul. 24, 1979 and assigned to RCA Corporation.

2. DESCRIPTION OF THE PRIOR ART

In a commonly-owned patent application of Y. Yarnitsky and S. Kaldor entitled "JIG FOR MACHINING STYLUS BLANKS" filed on Jul. 21, 1981 and having Ser. No. 285,620, now Pat. No. 4,433,794 a jig is disclosed which will automatically feed a single stylus blank from a stack of stylus blanks, fix the blank in position during machining, eject a machined stylus, and fix a subsequent stylus blank in position for a subsequent machining operation. That device includes a releasable gripping means which is operated by a solenoid-driven mechanical linkage located outside the housing. The releasable gripping means taught therein is a vice having two jaws, of which a fixed first jaw is formed by a lower housing section and a movable second jaw is formed by a deformable region of an upper housing section.

If that device develops a permanent deformation of the upper housing section, it is necessary to replace the entire upper housing section since the upper housing section is unitary. It would be desirable to provide a device which performs the same functions as that prior art device but which would not require the replacement of an entire housing section if the releasable gripping means malfunctions. Moreover, it would be desirable to provide a device in which both the releasable gripping means and the means for transporting individual blanks from a storage channel in the housing would be operated independently of each other by control means located within the housing.

SUMMARY OF THE INVENTION

In this invention, an improvement is disclosed for use in a jig of the above-referenced type. The jig has a housing which includes a front end and a storage channel. The jig also has a releasable gripping means for gripping and releasing stylus blanks which are transported via a feed channel to the front end of the housing. The jig further has a means for transporting individual blanks from the storage channel to the front end of the housing. One feature of the improvement is the inclusion of a control means located inside the housing for operating the releasable gripping means and the transporting means.

Another feature of the invention is the inclusion of a releasable gripping means which is separate from and is movably received within the housing. The feed channel is located in the releasable gripping means. Advantageously, the releasable gripping means includes a split collet and an elongated slotted bar attached thereto. The split collet may be moved forwardly and rearwardly into and out of the housing, to grip and to release blanks which are transported to the front end of the housing via the feed channel located in the bar.

BRIEF DESCRIPTION OF THE DRAWING

FIG. 1 is a cross-sectional left side view of a jig embodying the invention.

FIG. 2 is a cross-sectional view taken along line 2—2 of FIG. 1.

DETAILED DESCRIPTION OF THE PREFERRED EMBODIMENT

Figure 3:
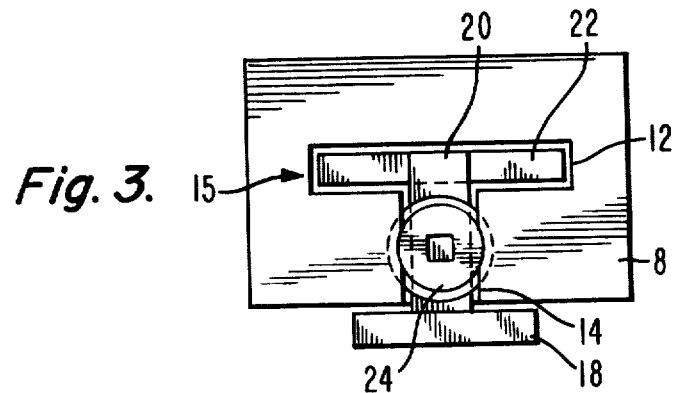
FIG. 3 is a plan view of a storage region of the jig.

In FIG. 1, a unitary housing, generally indicated by reference numeral 1, has a front end 2, a rear end 4, a central region 6, and a storage region 8. The housing 1 is elongated along a horizontal axis 10, which passes through the centers of the front end 2, the rear end 4, and the central region 6.

The storage region 8 is entirely above and perpendicular to the axis 10. As shown in FIG. 3, a vertical stem channel 14 within the storage region 8 extends leftwardly from a vertical storage channel 12 to the left side of the housing 1. The storage channel 12 and the stem channel 14 are mutually perpendicular, and form, within the storage region 8, a vertically-elongated recess 15 of T-shaped cross-section.

A stack 16 of diamond stylus blanks is disposed within the storage channel 12 and extends upwardly within the storage region 8. All of the stylus blanks in the storage channel 12 are parallel to the axis 10, and the stack 16 has the thickness of one stylus blank.

Figure 4:
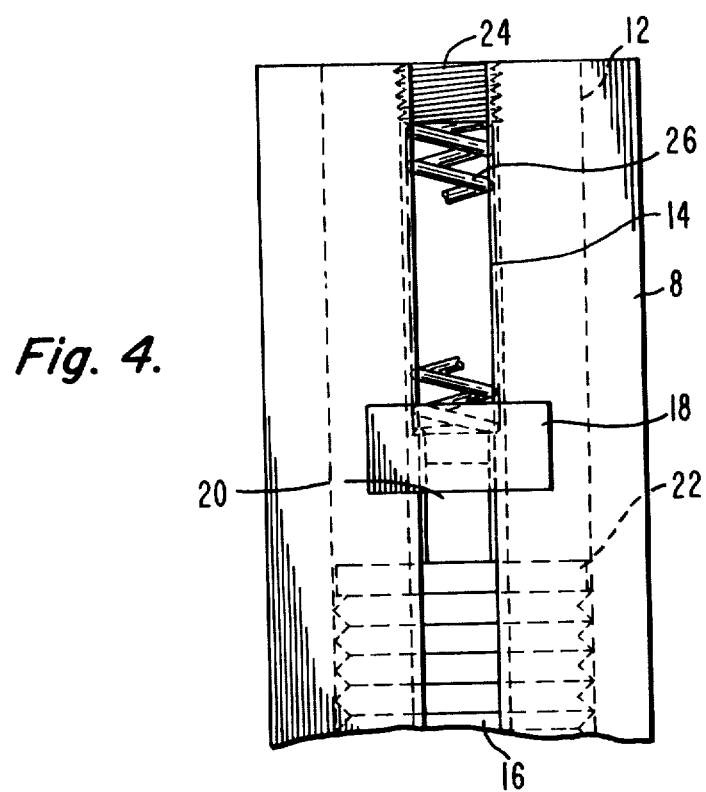
FIG. 4 is a partial elevation view of the storage region of the jig.

An exterior plate 18, a stem 20 and a storage channel plate 22 form a stack follower which rides in the recess 15, with the stem 20 riding in the stem channel 14 and the storage channel plate 22 riding in the storage channel 12. The exterior plate 18 and the storage channel plate 22 are vertical, parallel to each other, and connected together by the stem 20, as shown in FIGS. 2, 3, and 4. The storage channel plate 22 rests upon the topmost stylus blank in the stack 16. A setscrew 24 is threaded into the center of the stem channel 14 at the top of the storage region 8. A compression spring 26 is located between the setscrew 24 and the stem 20.

The storage channel 12 opens at its bottom end into a vertical slot 28 (see FIG. 1) which is located near a front end of an elongated bar 30 which is located in the housing 1 and which extends along the axis 10 between the front end 2 and the central region 6. The bar 30 has a split collet 32 at its front end, and can slide back and forth within the housing 1. Furthermore, the bar 30 is hollow, having in its front a feed channel 34 extending between the split collet 32 and the slot 28, and a bolt channel 36 in its rear. An elongated bolt 38 slides within the bolt channel 36. The feed channel 34 is shaped in a manner such that only one blank from the storage channel 8 can be introduced into the feed channel 34 at one time.

The bar 30 extends rearwardly into a cylindrical cavity 40. The cavity 40 is coaxial with the axis 10 and is located inside the housing 1 between the central region 6 and the rear end 4. The rear end of the bar 30 is connected to a forward end 42 of a movable cylinder 44. The movable cylinder 44 can slide forward and rearward within the cavity 40.

A rear end 46 of the movable cylinder 44 is closed off by a first piston 48, which abuts the rear end 46 and which is sealed thereto by a seal 50. The first piston 48 can slide forward and rearward within the cavity 40. The forward end 42 of the movable cylinder 44 and a forward surface 52 of the cavity 40 are urged apart by a first compression spring 54.

A second piston 58 slides within a cylindrical cavity 59 within the movable cylinder 44 and is sealed thereto by a seal 60. The bolt 38 extends rearward along axis 10 and through the cavity 59 into the second piston 58, to which the rear end of the bolt 38 is fixed. A second compression spring 62 is compressed between the forward end 42 of the movable cylinder 44 and the second piston 58, urging the second piston 58 rearwardly relative to the movable cylinder 44.

A fixed plug 66 closes off the cavity 40 at the rear end 4 of the housing 1, and is sealed to the rear end 4 by a seal 67. Two inlet lines 68 and 70 pass through the plug 66, as shown in FIG. 1. Inlet line 70 is aligned with the axis 10, while inlet line 68 is located above and parallel to inlet line 70. A rubber hose or other flexible conduit 72 is attached between inlet line 70 and a passage 73 which extends through the first piston 48.

Figure 5:
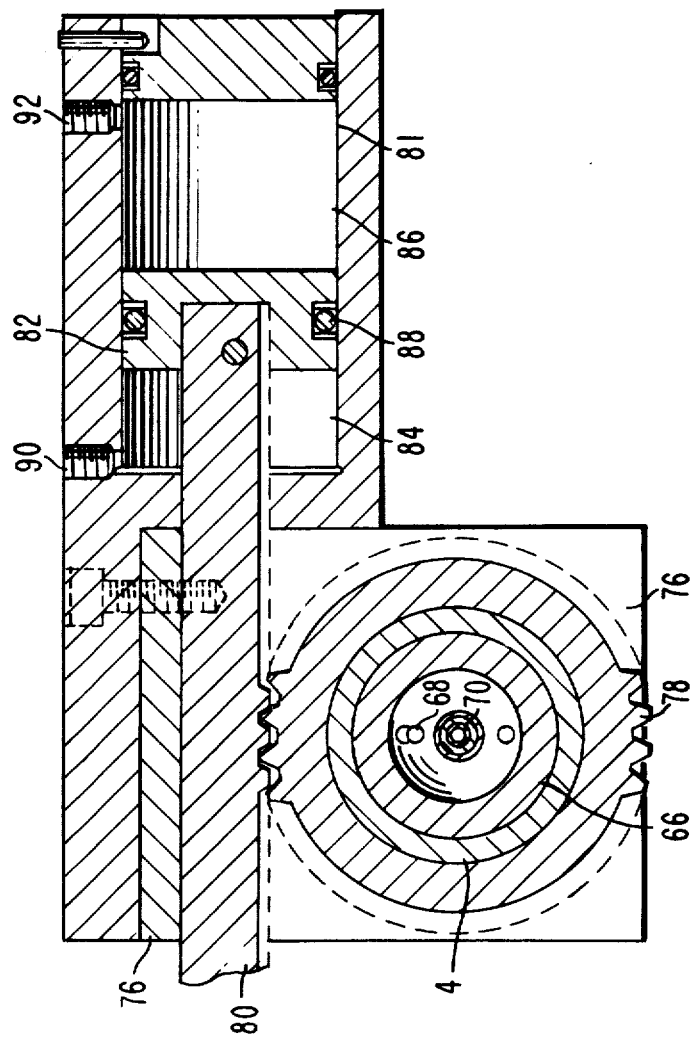
FIG. 5 is a cross-sectional view of the jig taken along line 5—5 of FIG. 1.

That region of the housing 1 which encloses the cavity 40 is surrounded by a hollow frustum-shaped bearing 74. The bearing 74 is itself surrounded by a support 76. The housing 1 is thus rotatable within the support 76 about the horizontal axis 10. A pinion gear 78 is fixed to the rear end 4 of the housing 1 and is coaxial with the axis 10. As can best be seen in FIG. 5, an elongated rack 80 is slidably mounted within the support 76 so as to engage the pinion gear 78 and to be movable rightwardly and leftwardly, and thereby rotate the housing 1 relative to the support 76.

The rack 80 extends into a cylinder 81 which is mounted on the support 76. A rack piston 82 is attached to the right end of the rack 80, is slidably located within the cylinder 81, and is sealed to the cylinder 81 by a seal 88. The rack piston 82 divides the cylinder 81 into two chambers 84 and 86. Chamber 84 is ported to the outside of a port 90, and chamber 86 is ported to the outside by a port 92.

Initially, the storage channel 12 will be filled with stylus blanks, and the bar 30 and the bolt 38 will be in their rearmost positions, i.e., they will be at the far right ends of their strokes, as viewed in FIG. 1. In this initial state, the stack follower will push the stack 16 down into slot 28 under the influence of the compression spring 26 until the lowest blank in the stack 16 is aligned with the feed channel 34.

Pressurized fluid introduced into inlet line 68 will flow into that portion of the cavity 40 adjacent the plug 66, will bear against a rear surface 56 of the first piston 48 and will thus push the first piston 48 forward. The motion of the first piston 48 will slide the movable cylinder 44 forward against pressure exerted by the first spring 54, and will slide the bar 30 forward so as to open the split collet 32. Pressurized fluid introduced into inlet line 70 will flow through the flexible conduit 72 and will bear against a rear surface 64 of the second piston 58, causing the second piston 58 and the bolt 38 to slide forward against pressure exerted by the second spring 62. This movement of the bolt 38 causes the lowest stylus blank to be advanced to the split collet 32 via the feed channel 34. Only this lowest stylus blank will be so advanced, since the feed channel 34 can accommodate only one stylus blank at a time. In the present embodiment, the bolt 38 comprises a means for transporting individual blanks from the storage channel 12 to the front end 2 of the housing 1. If desired, other mechanisms can be used for this means for transporting.

After this lowest stylus blank has been transported to the split collet 32 by the bolt 38, fluid pressure at inlet line 68 is relieved. This will cause the movable cylinder 44 and the bar 30 to slide rearward under pressure exerted by the first spring 54, thereby closing the split collet 32 around the stylus blank and fixing the stylus blank in place so that the front end of the stylus blank protrudes outwardly from the split collet 32 and is exposed for lapping or other machining. After the split collet 32 is fully closed, fluid pressure at inlet line 70 is relieved, causing the bolt 38 and the second piston 58 to slide rearward under pressure exerted by the second spring 62. After the slot 28 is unblocked by the rearward motion of the bolt 38, the next stylus blank in the stack 16 can be pushed down by the stack follower and aligned with the feed channel 34.

The stylus blank held by the split collet 32 is then lapped along desired crystal planes into a finished stylus, rotating the housing 1 as appropriate. The housing 1 is rotated by introducing pressurized fluid into one of ports 90 and 92 and allowing pressurized fluid to escape from the other port 92 or 90. This will move the rack piston 82 and the rack 80, and will rotate the housing 1. After a finished stylus has been lapped, repressurization of inlet line 68 will slide the bar 30 forward once again, opening the split collet 32. Then repressurization of inlet line 70 will push forward the bolt 38, transporting with it one new stylus blank from the stack 16. This new stylus will eject the finished stylus and replace it. The new stylus blank will be lapped after the split collet 32 recloses once more. This sequence can be repeated until the storage channel 12 is emptied.

It can be seen that the bar 30 and the split collet 32 form a releasable gripping means for gripping and releasing blanks transported to the front end 2 of the housing 1, and that the elongated bolt 38 forms a means for transporting the individual blanks. If desired, other mechanisms can be used for the releasable gripping means and the transporting means. In the present embodiment, the first piston 48 together with the second piston 58 comprise a control means for operating the releasable gripping means and the transporting means. Additionally, it can be seen in FIG. 1 that the stroke of bolt 38 is longer than the stroke of bar 30. Thus, even though forward motion of first piston 48 will be immediately transmitted to second piston 58 because these pistons 48 and 58 abut each other, the releasable gripping means and the means for transporting individual blanks from the storage channel 12 to the front end 2 of housing 1 operate independently of each other, since a slight forward movement of bolt 38 will be insufficient to push a stylus blank forward into the split collet 32. Either a gas or a liquid may be used for the pressurized fluid.

What is claimed is:
1. In a jig for use in machining blanks including
a housing having a front end and a storage channel,
a releasable gripping means supported by said housing for gripping and releasing blanks transported to the front end of the housing from said storage channel, and
means disposed within said housing for transporting individual blanks from said storage channel to said front end, the improvement comprising:
said transporting means being disposed within said releasable gripping means, both means being con- nected to control means for operating said releasable gripping means and said transporting means, said control means being located inside the housing and adapted to operate said releasable gripping means and said transporting means independently of each other.

2. The jig defined by claim 1, wherein said control means for operating said transporting means is contained within the control means for operating said releasable gripping means.

3. The jig defined by claim 1, wherein a feed channel, connecting the storage channel and said front end, is located within the releasable gripping means.

4. The jig defined by claim 3, wherein said means for transporting includes an elongated bolt slidably receivable within the feed channel and adapted for moving blanks therein by pushing them forward.

5. The jig defined by claim 3, wherein the releasable gripping means includes a split collet and an elongated slotted bar attached thereto, the split collet being forwardly and rearwardly movable out of and into the front end of said housing.

6. The jig defined by claim 3, wherein the feed channel is shaped in a manner that only one blank from the storage channel may be introduced into the feed channel at one time.

7. The jig defined by claim 1, wherein the housing is elongated in shape along an axis, wherein a pinion gear is fixed to the housing and adapted to cause the housing to rotate about said axis, and wherein the housing is rotatably mounted on a support to permit rotation of the housing about said axis.

8. The jig defined by claim 7, wherein the pinion gear is engaged by a rack.

9. The jig defined by claim 1, wherein said control means includes a first piston connected to said releasable gripping means and a second piston connected to said transporting means.

10. The jig defined by claim 9, wherein the second piston slides forwardly and rearwardly within a movable cylinder, and the movable cylinder is moved forwardly and rearwardly by the first piston.

11. The jig defined by claim 10, wherein the second piston is biased rearwardly by a second spring which is located between the movable cylinder and the second piston, and the movable cylinder is biased rearwardly by a first spring which is located between the housing and the movable cylinder.

12. In a jig for use in machining blanks which includes
a housing having a front end and a storage channel, and
means for transporting individual blanks from the storage channel to the front end of the housing, the improvement comprising:
a releasable gripping means movably received within the housing for gripping and releasing blanks transported to said front end, said releasable gripping means including a split collet and an elongated slotted bar attached thereto, the split collet being forwardly and rearwardly movable out of and into the front end of said housing.

13. The jig defined by claim 12, wherein the feed channel is shaped in a manner such that only one blank from the storage channel may be introduced into the feed channel at one time.

14. The jig defined by claim 12, wherein a feed channel connecting the storage channel and said front end is located within the releasable gripping means.

15. The jig defined by claim 14, wherein said means for transporting includes an elongated bolt slidably receivable within the feed channel and adapted for moving blanks therein by pushing them forward.

* * * * *